(12) United States Patent
Ebrahimi Afrouzi

(10) Patent No.: US 10,368,711 B1
(45) Date of Patent: Aug. 6, 2019

(54) METHOD FOR DEVELOPING NAVIGATION PLAN IN A ROBOTIC FLOOR-CLEANING DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 182 days.

(21) Appl. No.: 15/449,531

(22) Filed: Mar. 3, 2017

Related U.S. Application Data

(60) Provisional application No. 62/303,225, filed on Mar. 3, 2016.

(51) Int. Cl.
| | |
|---|---|
| *A47L 11/40* | (2006.01) |
| *G05D 1/02* | (2006.01) |
| *B25J 9/16* | (2006.01) |
| *G05D 1/00* | (2006.01) |
| *B25J 11/00* | (2006.01) |

(52) U.S. Cl.
CPC ....... *A47L 11/4011* (2013.01); *A47L 11/4061* (2013.01); *A47L 11/4066* (2013.01); *B25J 9/161* (2013.01); *B25J 9/1664* (2013.01); *B25J 11/0085* (2013.01); *G05D 1/0016* (2013.01); *G05D 1/0219* (2013.01); *A47L 2201/04* (2013.01)

(58) Field of Classification Search
CPC .............. A47L 11/4011; A47L 11/4061; A47L 11/4066; A47L 2201/04; B25J 9/161; B25J 9/1664; B25J 11/0085; G05D 1/0219; G05D 1/0016

USPC .................................................. 700/245, 257
See application file for complete search history.

(56) References Cited

U.S. PATENT DOCUMENTS

| | | | |
|---|---|---|---|
| 6,732,826 B2 | 5/2004 | Song et al. | |
| 7,430,455 B2 | 9/2008 | Casey et al. | |
| 7,663,333 B2* | 2/2010 | Jones .................... | G05D 1/0219 318/568.11 |
| 8,463,438 B2 | 6/2013 | Jones et al. | |
| 8,838,274 B2 | 9/2014 | Jones et al. | |
| 9,128,486 B2 | 9/2015 | Chiappetta et al. | |
| 9,314,924 B1* | 4/2016 | Laurent .................... | B25J 9/163 |
| 2003/0120389 A1* | 6/2003 | Abramson ................ | A47L 5/22 700/245 |
| 2006/0020369 A1* | 1/2006 | Taylor ..................... | A47L 9/009 700/245 |
| 2007/0006404 A1* | 1/2007 | Cheng ..................... | A47L 11/32 15/52.1 |
| 2007/0250212 A1* | 10/2007 | Halloran ................... | A47L 5/30 700/245 |
| 2008/0276408 A1* | 11/2008 | Gilbert, Jr. ............... | A47L 11/34 15/320 |
| 2008/0281470 A1* | 11/2008 | Gilbert, Jr. ............... | A47L 11/34 700/259 |
| 2013/0061417 A1* | 3/2013 | Vanderstegen-Drake | .................. A47L 5/30 15/319 |
| 2015/0088287 A1* | 3/2015 | Nagamatsu .......... | H04L 12/2818 700/90 |
| 2015/0283703 A1* | 10/2015 | Izhikevich ............... | B25J 9/163 706/11 |

(Continued)

*Primary Examiner* — Jaime Figueroa

(57) ABSTRACT

A path planning method for a robotic floor-cleaning device in which a user's commands are repeated autonomously by the robotic floor-cleaning device at a later time.

8 Claims, 1 Drawing Sheet

(56) References Cited

U.S. PATENT DOCUMENTS

2016/0075017 A1\* 3/2016 Laurent .................... B25J 9/163
                                                     700/264
2018/0135325 A1\* 5/2018 Schloss ................ E04H 4/1654

\* cited by examiner

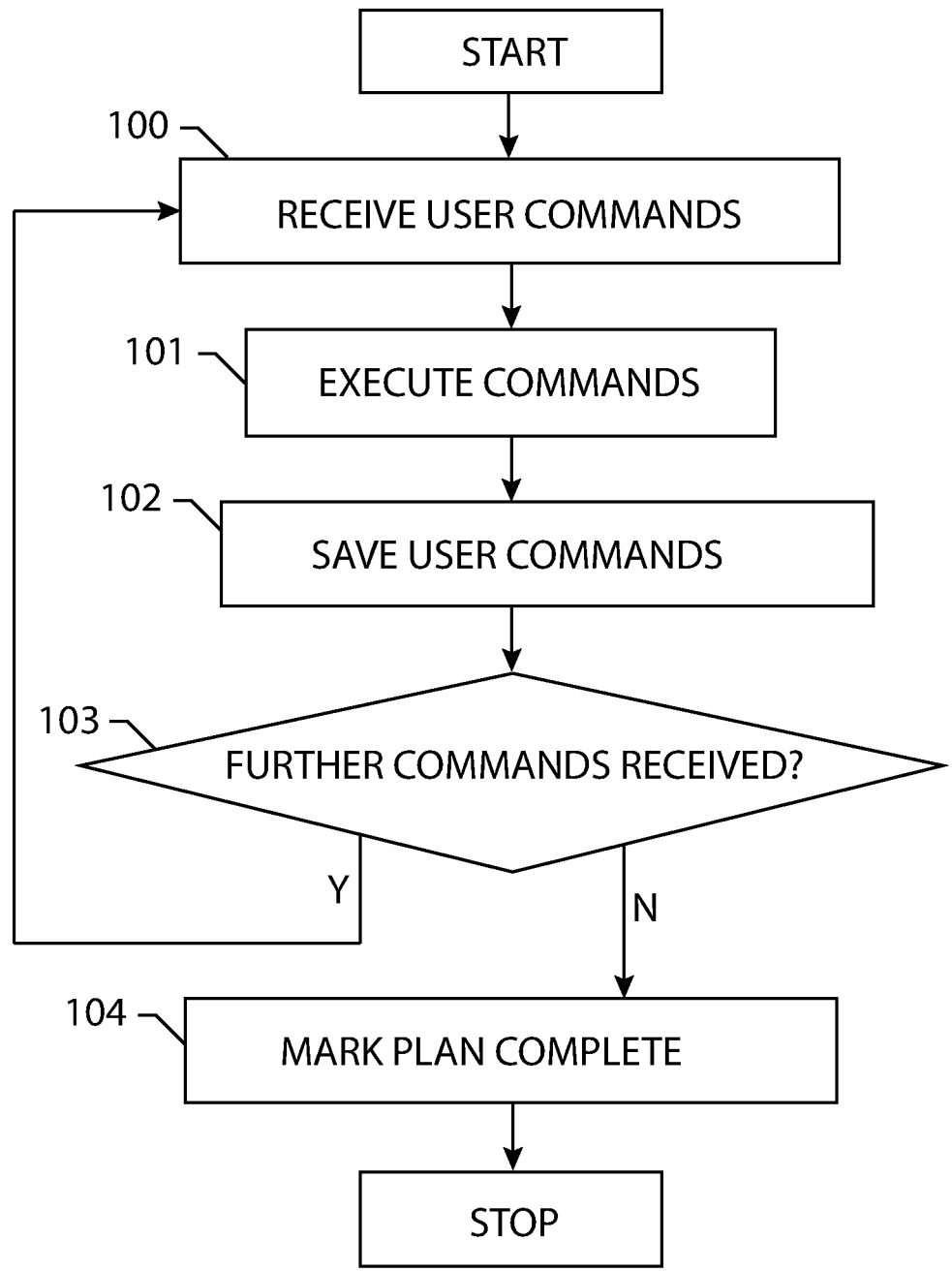

METHOD FOR DEVELOPING NAVIGATION PLAN IN A ROBOTIC FLOOR-CLEANING DEVICE

CROSS-REFERENCE TO RELATED APPLICATIONS

This application claims the benefit of provisional patent application Ser. No. 62/303,225 filed Mar. 3, 2016 by the present inventor.

FIELD OF INVENTION

The present invention relates to navigation methods of robotic floor-cleaning devices.

BACKGROUND

Various methods have been devised for navigating robotic floor-cleaning device automatically. However, paths derived automatically are often not as efficient or desirable as paths selected by a user. A user may more quickly and easily identify areas where a robotic floor-cleaning device should not drive, for example, in an area with a lot of cords and cables or near a fragile piece of furniture. A need exists for a method to replicate a human's ability to identify an ideal path for a robotic floor-cleaning device.

SUMMARY

It is a goal of the present invention to provide a path planning method for a robotic floor-cleaning that emulates the decision-making of a user. The aforementioned goal is achieved by receiving a sequence of navigation commands from a user, saving that particular sequence, then re-executing it autonomously, without the need for the user to reinput the sequence of navigation commands.

BRIEF DESCRIPTION OF DRAWINGS

FIG. 1 illustrates the process of saving a user-input navigation plan embodying features of the present invention.

DETAILED DESCRIPTION OF THE INVENTION

The present invention proposes a method for developing a navigation plan in a robotic floor-cleaning device. For the purposes of this invention, a robotic floor-cleaning device shall be assumed to comprise, at minimum, a shell, a chassis, a set of wheels, at least one motor connected for powering the wheels, a control unit to control movement of the robotic floor cleaning device, an input/output means electrically coupled to the control unit, a memory unit to store data, and a means for cleaning a work surface.

Referring to FIG. 1, the process of saving a user-input navigation plan is illustrated. In a first step 100, a robotic floor-cleaning device receives input from a user commanding navigational movement via an input device. In a next step 101, the robotic floor-cleaning device executes the commands. In a next step 102, the robotic floor-cleaning device saves the user commands in a memory unit. If, in a next step 103, the robotic floor-cleaning device continues to receive inputs, the method repeats steps 100, 101, and 102 until such a time as no further user input is received for a predetermined length of time. When no further user input is received during the predetermined length of time, the method proceeds to a next step 104 in which the navigational plan is marked as complete. Any number of navigational plans may be saved in the memory unit, subject only to the limits of the memory unit.

The robotic floor-cleaning device may access saved navigational plans at any time and re-execute the pattern commanded by the user. In some embodiments, a robotic floor-cleaning device that further comprises a clock is configured to re-execute a pattern commanded by a user at the same time of day as when the original commands were input. In some embodiments, the robotic floor-cleaning device is configured to re-execute a pattern commanded by a user on the same day of the week as when the original commands were input.

In the preferred embodiment, a robotic floor-cleaning device with a means for creating a map of its environment incorporates the location of user commands into its map of the environment.

In some embodiments, the method further comprises suggesting a navigational plan to a user via an input/output means before executing it.

One skilled in the art will appreciate that various mapping techniques, such as SLAM technology, or receiving a map of the environment from an external source, may be used without departing from the scope of the invention.

In some embodiments the input/output device is wireless and can send and receive signals to and from remote devices, such as remote controls and smartphones.

In some embodiments, inputs from a user and outputs from the robotic floor cleaning device may be provided through a software application installed on an internet-connected device, such as a smartphone, a computer, or a tablet.

The invention claimed is:

1. A path planning method for a robotic floor-cleaning device comprising:
    in a first step, receiving by a robotic floor-cleaning device a sequence of one or more commands from a user via an input device;
    in a second step, executing the sequence of commands;
    in a third step, saving the sequence of commands in a memory unit after a predetermined amount of time from receiving a most recent command; and,
    in a fourth step, re-executing the sequence of commands.

2. The path planning method of claim 1, wherein the fourth step is only carried out if a prompt is accepted by a user via the input device.

3. The path planning method of claim 1 further comprising associating the sequence of commands with a location at which the robotic floor-cleaning device was located when the sequence was received and carrying out the fourth step when the robotic floor-cleaning device is at that location anew.

4. The path planning method of claim 1 wherein the input device is any of a remote control, a user interface on the robotic floor-cleaning device, a software interface on a computer, a software interface on a smartphone, and a software interface on a tablet.

5. A method for navigating a robotic floor-cleaning device comprising:
    in a first step, receiving by a robotic floor-cleaning device a sequence of one or more navigation commands from a user via an input device;
    in a second step, executing the sequence of navigation commands;

in a third step, saving the sequence of navigation commands in a memory unit after a predetermined amount of time from receiving a most recent command; and, in a fourth step, re-executing the sequence of navigation commands.

6. The navigation method of claim 5, wherein the fourth step is only carried out if a prompt is accepted by a user via the input device.

7. The navigation method of claim 5 further comprising associating the sequence of navigation commands with a location at which the robotic floor-cleaning device was located when the sequence was received and carrying out the fourth step when the robotic floor-cleaning device is at that location anew.

8. The navigation method of claim 5 wherein the input device is any of a remote control, a user interface on the robotic floor-cleaning device, a software interface on a computer, a software interface on a smartphone, and a software interface on a tablet.

\* \* \* \* \*